United States Patent
Deruelle et al.

(10) Patent No.: US 7,026,013 B2
(45) Date of Patent: Apr. 11, 2006

(54) USE OF AN EPOXY-AND/OR CARBOXY-FUNCTIONALISED POLYORGANOSILOXANE, AS ACTIVE MATERIAL IN A LIQUID SILICONE COMPOSITION FOR WATER REPELLENCY TREATMENT OF BUILDING MATERIALS

(75) Inventors: Martial Deruelle, Millery (FR); Gérard Mignani, Lyons (FR)

(73) Assignee: Rhodia_Chimie, Aubervilliers (FR)

( * ) Notice: Subject to any disclaimer, the term of this patent is extended or adjusted under 35 U.S.C. 154(b) by 0 days.

(21) Appl. No.: 10/450,493

(22) PCT Filed: Dec. 27, 2001

(86) PCT No.: PCT/FR01/04217

§ 371 (c)(1),
(2), (4) Date: Jan. 21, 2004

(87) PCT Pub. No.: WO02/053515

PCT Pub. Date: Jul. 11, 2002

(65) Prior Publication Data

US 2004/0132952 A1 Jul. 8, 2004

(30) Foreign Application Priority Data

Dec. 29, 2000 (FR) .................................. 00 17309

(51) Int. Cl.
*B05D 5/00* (2006.01)

(52) U.S. Cl. .................. 427/387; 427/393.6; 524/860; 106/2; 528/33

(58) Field of Classification Search ................ 427/387, 427/393.6; 524/860; 106/2; 528/33
See application file for complete search history.

(56) References Cited

U.S. PATENT DOCUMENTS

| | | | | |
|---|---|---|---|---|
| 4,810,748 A | * | 3/1989 | Spells | 524/725 |
| 4,876,152 A | * | 10/1989 | Kang | 428/447 |
| 5,080,824 A | * | 1/1992 | Bindl et al. | 134/42 |
| 6,120,849 A | * | 9/2000 | Smith et al. | 427/372.2 |
| 6,590,026 B1 | * | 7/2003 | Dorget et al. | 524/588 |

FOREIGN PATENT DOCUMENTS

FR    2 784 115    *    4/2000

* cited by examiner

*Primary Examiner*—Kuo-Liang Peng

(57) ABSTRACT

The invention relates to water-repellant liquid silicone compositions intended for impregnating porous building materials, such as mineral or (ligno)cellulosic materials And comprising epoxy functionalized polyorganosiloxanes as main active material in these water-repellant liquid silicone compositions. The invention also relates to a process for making said porous building materials, water-repellant with the aid of the above said liquid silicone composition, and a process for preparing this composition is also targeted by the invention.

12 Claims, No Drawings

USE OF AN EPOXY-AND/OR CARBOXY-FUNCTIONALISED POLYORGANOSILOXANE, AS ACTIVE MATERIAL IN A LIQUID SILICONE COMPOSITION FOR WATER REPELLENCY TREATMENT OF BUILDING MATERIALS

This application is an application under 35 U.S.C. Section 371 of International Application No. PCT/FR01/04217 filed on Dec. 27, 2001.

The field of the invention is that of the water repellency of porous building materials (especially mineral or [ligno] cellulosic materials), which are thus moisture-sensitive. In general, the water repellency is achieved on the building material components once they have been assembled to form parts of buildings. More specifically, the water-repellency treatments that are of interest in the context of the invention are those performed using liquid silicone compositions, comprising silicic compounds of the organosilane or polyorganosiloxane type. The porous building materials under consideration may be, for example, stones based on calcium carbonate and/or silica and/or aluminosilicates, concretes, mortars, terracottas (bricks, tiles, etc.), woods, etc.

In particular, the invention relates to water-repellant liquid silicone compositions intended for impregnating porous building materials, for example mineral, or (ligno)cellulosic materials.

More specifically, a subject of the invention is the use of a particular class of functionalized polyorganosiloxanes as main active material in these water-repellant liquid silicone compositions.

A process for making porous building materials, preferably mineral or (ligno)cellulosic materials, water-repellant with the aid of the above said liquid silicone composition, and a process for preparing this composition are also targeted by the invention.

It is known that organosilanes (especially alkoxylated, hydroxylated or aminated organosilanes) and, to a lesser extent, polyorganosiloxanes (POS) have been used for many years to impregnate porous building materials (for example mineral or (ligno)cellulosic materials) so as to protect them against water penetration, the harmful effects of which with respect to constructions are numerous: bursts caused by frost, appearance of moss and lichen, loss of heat insulation, etc.

Water-repellant liquid silicone compositions exist either in the form of solutions in organic solvents such as white spirit or heptane, or in the form of aqueous emulsions that have appeared more recently on the market. Conventionally, after impregnation, the organic solvent phase or the aqueous phase of these compositions evaporates and the silicone active material remains in the bulk and at the periphery of the porous building material, so as to form a barrier to moisture.

For reasons of cost, hygiene, safety and environmental protection, it is sought to replace solvent-phase water-repellant liquid silicone compositions with aqueous silicone emulsions. However, a certain number of major difficulties have arisen in the development of these aqueous silicone water-repellant systems. In this regard, the major problem is that of ensuring the stability on storage of the aqueous silicone emulsion, while at the same time maintaining a water-repellency efficiency for the constituents of the silicic active material that is at least as good as that obtained with the solvent-phase systems. This efficacy is especially dependent on the reactivity of the silicic active material toward the porous support to be made water-repellent. Specifically, it is common to find that a gain in reactivity is obtained only at the expense of the stability of the emulsion.

In order for water repellency using a liquid silicone composition to be successful, it is necessary:

for the rheology of this composition to allow penetration into the porous building material to a depth ranging from several millimeters to several centimeters, for a reaction to take place between the porous building material and the water-repellent active silicic material, and preferably, for this active silicic material to crosslink in the porous building material, this crosslinking possibly being the reaction that will give rise to the creation of bonds between the porous building material and the water-repellent silicic material.

Two other major difficulties encountered in the formulation of water-repellent aqueous silicone systems are the following:

compatibilization of a hydrophobic silicone compound in a hydrophilic medium such as water, stability of the reactive functions of an aqueous medium.

It is thus a matter of finding a compromise between stability and reactivity.

To satisfy these technical specifications, it has been proposed in the prior art to use liquid silicone compositions comprising alkoxysilanes and/or hydroxysilanes and/or aminosilanes, which have the advantage of having a molecular mass that is low enough to allow good penetration into porous building materials, and which are capable of condensing in situ to produce crosslinked silicone resins.

Aqueous emulsions of alkoxysilanes and/or hydroxysilanes and/or aminosilanes pose stability problems that were solved hitherto by using high concentrations of emulsifiers, these emulsifiers having a harmful effect on the water repellency.

Documents EP-A-0 442 098, EP-A-0 358 652 and U.S. Pat. No. 4,620,878 disclose such water-repellent aqueous systems formed by aqueous silicone emulsions with a high concentration of emulsifiers.

Document U.S. Pat. No. 5,073,195 describes water-repellent liquid silicone compositions comprising water-insoluble alkyltrialkoxysilanes and water-soluble aminoalkylalkoxysilanes. The drawback of these compositions is that they produce alkoxy and alcohol functions during hydrolysis, which are harmful to the water repellency.

European patent application EP-A-0 675 128 describes water-repellent liquid silicone compositions in the form of aqueous emulsions based on water-soluble organosilanes (aminoalkylalkoxysilanes) and small amounts of water-insoluble organosilanes (methyltrimethoxysilane or vinyltrimethoxysilane). It is clear that the presence of large amounts of hydrophilic silanes does not lend itself toward improving the water repellency.

EP-A-0 716 127 and EP-A-0 716 128 disclose alcohol-free aqueous emulsions for water repellency, based on water-soluble aminosilanes and alkylsilanes, and water-insoluble vinylsilanes or ureidosilanes. The water-repellent silicic material according to these compositions offers relatively unsatisfactory adhesion properties on porous building materials.

To overcome the deficiencies of functionalized silanes in water-repellent liquid silicone compositions, it has been proposed to use water-repellent aqueous emulsions containing, as silicone active materials, resins comprising units M, T and/or Q, it being recalled that in the terminology of silicone chemistry, the siloxane units M, D, T and Q are defined as follows:

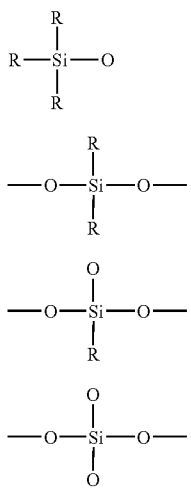

Mixed aqueous systems based on aminosilanes and/or alkoxysilanes and alkoxylated DT(OR) resins and/or MQ resins are also known.

All these known aqueous systems can be improved upon.

Moreover, U.S. Pat. No. 5,885,341 describes solvent-free aqueous formulations containing POSs:
- functionalized with alkyl glycidyl ether and/or alkylacryloxy and/or alkylmethacryloxy and/or aminoalkyl units, in which each silicon atom Comprises a functional unit, and
- obtained from alkoxysilanes bearing the abovementioned functionalities.

Water-repellent liquid silicone compositions of this type suffer from unacceptable drawbacks relating to the complexity of the process for preparing the functionalized POS, since this preparation specifically necessitates the use of two, three or even four different functionalized silanes with relatively labor-intensive heating and distillation steps.

In addition, the results obtained in terms of stability on storage of the aqueous emulsion and in terms of water repellency are not optimal.

U.S. Pat. No. 4,876,152 describes water-repellent silicone compositions for masonry work, comprising the product of reaction of a linear polyorganosiloxane bearing SiH units with an alkenylated ($C_7$–$C_{30}$) succinic anhydride. This is a platinum-catalyzed hydrosilylation reaction which leads to a linear POS consisting of dimethylsiloxy units (D) and siloxy units (D') substituted with a methyl and a succinic anhydride function, which are linked to the silicon via a $C_7$–$C_{30}$ coupling unit. This linear POS bears trimethylsiloxy units (M) at the end of the chain. This POS functionalized with succinic anhydride is dissolved in mineral spirits or is emulsified in an aqueous phase. The silicone formulation thus obtained is applied to masonry substrates, for example cement. There is no mention of crosslinking the anhydride-functionalized POS on the support to be made water-repellent. The water-repellency performance quality remains to be assessed, as does the quality of the attachment to the support. There is every reason to think that this silicone formulation is not entirely satisfactory in this respect.

Patent application FR-A-2 784 115 concerns a paint containing:
A—3 to 30 parts by weight of an organic copolymer latex, for example styrene/acrylic, comprising 50% solids;
B—an epoxidized linear POS, in a proportion of 0.05 part by weight, in the form of an emulsion with a solids content of 65%; and
C—a filler, for example calcium carbonate, in a proportion of 100 parts by weight.

The epoxy-functionalized POS emulsion is described in said document as being a water-repellent additive for producing a paint binder. It is clear that the epoxy-functionalized POS according to said document is not the predominant water-repellent constituent of the paint disclosed. It is merely an additive present in very small proportions in the active material. Thus, in the examples D, the epoxy-functionalized POS represents only 0.96% by dry weight of the active material essentially consisting of the styrene/acrylic latex A. Moreover, FR-A-2 784 115 does not make allusion to any ability of the epoxy-functionalized POS B to crosslink and to react by itself with the building substrate. In point of fact, FR-A-2 784 115 discloses nothing other than a paint comprising epoxy-functionalized POS as water-repellent additive and binder.

Finally, patent U.S. Pat. No. 5,196,054 describes a preparation for the water-repellent impregnation of mineral and porous building materials. This preparation is in the form of aqueous emulsions comprising, as silicone active material:
a) 5% to 45% by weight of a trialkoxysilane,
b) 45% to 5% by weight of a mixture consisting of:
   an aminotrialkoxysilane optionally bearing epoxy units, and
   an $\alpha,\omega$-diol POS, these terminal hydroxyl functions being condensable with the alkoxytrialkoxysilane or aminotrialkoxysilane,
c) 0.5% to 10% by weight of an emulsifier,
d) 40% to 49.5% of water.

In accordance with example 3, the water-repellent aqueous emulsion obtained comprises a POS bearing from 30 to 80 units D, the ends of which are functionalized with a 3-(glycidyloxypropyl)trialkoxysilane residue [1.2 silane/chain]. The emulsifier used is a mixture of ethoxylated fatty alcohols and of alkyl arylsulfonate. The silicone active material also comprises n-propyltriethoxysilane. The emulsion comprises (in parts by weight=pw):
62 pw of $\alpha,\omega$-epoxidized POS,
49 pw of propyltriethoxysilane, and
11 pw of emulsifiers,
per 100 pw of water.

The presence of alkyltrialkoxysilane in the silicone active material of this water-repellent liquid composition is a factor with regard to instability and limitation of the water-repellency performance qualities. The presence of this alkyltrialkoxysilane is necessary according to this prior reference in order to bring about a crosslinking reaction and a reaction of the silicone active material with the substrate to be made water-repellent. In brief, this aqueous emulsion combining alkoxysilanes and $\alpha,\omega$-aminated or epoxidized POSs can be improved upon.

One of the essential objectives of the present invention is, precisely, to improve upon this prior art by remedying the deficiencies of the other prior technical approaches discussed above.

Another essential objective of the invention is to provide a water-repellent liquid silicone composition that offers the best possible technical compromise as regards the cost, the ease of use, the stability on storage and the attachment to the materials to be made water-repellent, and also in terms of the intensity and duration of the water-repellency efficacy.

Another essential objective of the invention is to provide a water-repellent liquid silicone composition in the form of a stable aqueous emulsion that is very reactive on the support to be impregnated.

Another essential objective of the invention is to provide a water-repellent liquid composition that is stable on storage and that is capable of reacting/crosslinking with the building material to be made water-repellent, as soon as said composition is placed in contact with said material.

Another essential objective of the invention is to provide a water-repellent liquid silicone composition that is free of silanes, and especially of silanes bearing condensable units of the alkoxy and/or hydroxyl type.

Another essential objective of the invention is to propose the use of known functionalized silicone compounds in a novel functionality, i.e. the water repellency of porous building materials [mineral and/or (ligno)cellulosic materials].

Another essential objective of the invention is to provide a process for making porous building materials [mineral and/or (ligno)cellulosic materials] water-repellent, which is easy to perform, safe and efficient.

Another essential objective of the invention is to provide a process for preparing a water-repellent silicone composition of the type mentioned in the abovementioned objectives.

These objectives, among others, are achieved by the invention, which relates firstly to the use of at least one linear or cyclic polyorganosiloxane (POS) bearing units:

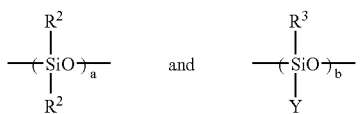

this POS preferably being linear, of formula (I):

$$(R^1)_3Si-O-(SiO)_a-(SiO)_b-Si(R^1)_3$$
with $R^2$ on the first SiO and $R^2$, $Y$ on the second (I)

in which:
the radicals $R^1$ are identical to or different than each other and each represent an alkyl, an aryl, an arylalkyl or Y; preferably a linear or branched $C_1$–$C_{10}$ alkyl or a phenyl;
the radicals $R^2$ are identical to or different than each other and each represent an alkyl, an aryl or an arylalkyl; preferably a linear or branched $C_1$–$C_{10}$ alkyl or a phenyl;
the radical $R^3$ represents an alkyl; an aryl, an arylalkyl or Y; preferably a linear or branched $C_1$–$C_{10}$ alkyl or a phenyl;
the radical Y is a functional radical chosen from those carrying at least one epoxy unit;
a and b are chosen such that:

$1 \leq a+b \leq 1000$ preferably $10 \leq a+b \leq 200$ and even more preferably $50 \leq a+b \leq 100$ and $1/1000 \leq b/(a+b) < 1$ preferably $1/100 \leq b/(a+b) \leq 4/5$ and even more preferably $1/20 \leq b/(a+b) \leq 3/4$, b may be equal to 0, and in this case at least one of the radicals $R^1$ represents Y, preferably at least one of the radicals $R^1$ on each of the two terminal Si atoms of the POS of formula (I) corresponds to Y, as an active material in a liquid silicone composition intended to impregnate a porous building material, so as to make it water-repellent, this POS (I) representing at least 50% by weight, preferably at least 80% by weight and even more preferably at least 90% by weight of the active material of the water-repellent liquid silicone composition, this POS (I) being capable by itself of crosslinking as soon as it comes into contact with the building material and/or of reacting with said building material to bind thereto.

According to one variant, b is other than 0 in formula (I) of the POS used in the context of the use according to the invention. In this variant, the POS (I) necessarily comprises at least one function Y in the chain.

It is thus seen that the present invention proceeds from the selection of a particular class of POSs functionalized with epoxy units, these selected POSs moreover having a limited number of siloxane units.

After long and laborious research, the inventors have thus demonstrated, entirely surprisingly and unexpectedly, that the functionalized silicones belonging to the selected class according to the invention react and crosslink on contact with building materials, in particular porous building materials such as:
stones based on $CaCO_3$ and/or $SiO_2$ and/or aluminosilicates (clays),
concrete or mortar,
wood,
or terracotta, tiles, etc.

As regards the epoxy-functionalized POSs and the porous building materials (basic) such as those comprising $CaCO_3$, it is astonishing to find that epoxy units react without catalyst, without initiator and without actinic activation or heat, under basic conditions, whereas a person skilled in the art knows that the normal conditions for opening epoxy rings are, rather, acidic conditions.

In accordance with the use according to the invention, the water-repellent aqueous emulsions are relatively unreactive and thus stable on storage (several months) since they have a reduced tendency to polycondensate in the droplets of silicone phase. On the other hand, these systems react on contact with "reactive" supports, which are often alkaline, such as mortar, concrete or terracotta.

For the purposes of the present invention, the term "active material" advantageously denotes everything that constitutes the liquid silicone composition with the exclusion of the liquid vehicle (support), which may be the solvent in the case where the composition is a solution, or alternatively the continuous phase (for example aqueous) in the case where the composition is an emulsion or a dispersion. The "active material" corresponds to all of the constituents of the composition that are active in terms of water repellency. This includes, inter alia, silicones.

In accordance with the use according to the invention, it is preferable to use linear functionalized POSs, bearing in mind that cyclic functionalized POSs Y (for example POSs of D4 type) may be suitable.

The selection according to the invention makes it possible to achieve a compromise between, on the one hand, the crosslinking density and the density of creation of bonds with the porous building material, and, on the other hand, the optimization of the final hydrophobicity of the silicone active material.

For the purposes of the invention, one of the criteria for evaluating the water-repellency performance qualities is given by the measurement of the drop angle. It is considered that the surface of a building material is sufficiently hydrophobic once this drop angle is greater than or equal to 90°.

Another, stricter criterion is that of the water uptake of a water-repellent-treated material immersed into an aqueous medium. Thus, the water-repellency performance qualities will be excellent if the sample is capable of remaining in water for 28 days without any uptake taking place.

In point of fact, stone or other porous building materials can make it possible to initiate the crosslinking of the epoxidized POSs according to the invention, this crosslinking being necessary for the water repellency.

Identical or different POSs may be used within the same water-repellent liquid silicone composition.

The functional units Y may be present in the polyorganosiloxane chain on the units D and/or on a: least one of the two ends of the chain.

In the preferred embodiment of the invention, the POS(s) (I) is(are,) functionalized with at least one radical Y bearing at least one epoxy unit and the radicals $R^2$ represent, independently:

- a linear $C_1$–$C_6$ alkyl preferably of methyl, ethyl, propyl or octyl type or a cycloalkyl containing between 5 and 8 carbon atoms,
- an aryl radical containing between 6 and 12 carbon atoms that may be substituted, preferably a phenyl or a dichlorophenyl, or
- an aralkyl radical with an alkyl portion containing between 5 and 14 carbon atoms and an aryl portion containing between 6 and 12 carbon atoms, optionally substituted on the aryl portion with halogen, alkyl and/or alkoxy groups containing from 1 to 3 carbon atoms.

Again according to a preferred embodiment of the invention, the end radicals $R^1$ correspond to the same definition as the preferred definition given above for $R^2$.

It is also desirable for the functional units Y to correspond independently to an epoxy-functional group, linked to the silicon of the POS via a divalent radical containing from 2 to 20 carbon atoms that may contain at least one hetero atom, preferably oxygen.

Even more preferably, Y is selected from the following radicals:

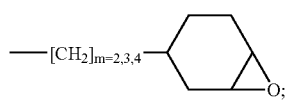

-continued

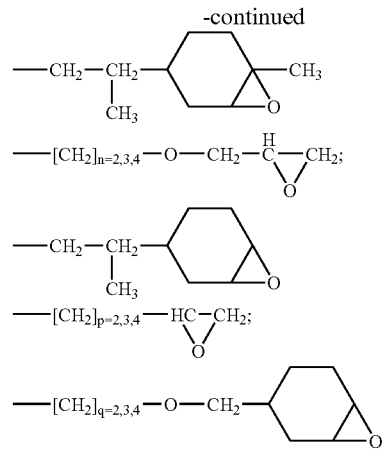

According to one variant, the radicals $R^1$, $R^2$, $R^3$ and Y may be substituted especially with halogens.

In practice, the radicals $R^3$, provided that they are different than Y, correspond independently to the same definition as that given above for $R^2$ and $R^1$.

In this preferred embodiment, the epoxidized functions Y are preferably in the chain and optionally on at least one of the end Si atoms of formula (I).

According to one variant, some of the functional radicals Y may be radicals Y' bearing at least one carboxylic acid and/or carboxylic acid salt and/or carboxylic anhydride unit.

These units Y' may be, for example:

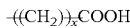

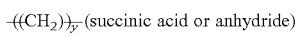

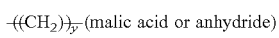

with x=2 to 30 and y=0 to 30.

Advantageously, the functions Y' are in the chain and/or at the end of the chain of the POS (I), for example at the two ends only.

The linear POSs (I) may be oils with a dynamic viscosity at 25° C. of about from 10 to 100 000 mPa.s, generally of about from 50 to 5 000 mPa.s and even more preferably from 100 to 600 mPa.s, or gums with a molecular mass of about $1 \times 10^6$ g.

When they are cyclic POSs, the latter consist of units D advantageously bearing a functional radical Y and a radical R3 as defined above.

These cyclic polyorganosiloxanes may have a viscosity of about from 1 to 5 000 mPa.s at 25° C.

The dynamic viscosity at 25° C. of all the silicones under consideration in the present specification may be measured using a Brookfield viscometer, according to AFNOR standard NFT 76 102 of February 1972.

It is entirely within the capacity of a person skilled in the art of silicone chemistry to obtain such functionalized POSs.

According to one advantageous arrangement of the invention, in the context of the use, the water-repellent liquid silicone composition is an aqueous emulsion containing:

a) one or more POSs (I)
b) one or more surfactants, and
c) water.

The surfactant(s) used is(are) nonionic, ionic or zwitterionic surfactants.

In practice, it may be, for example, a nonionic surfactant of the ethoxylated fatty alcohol type containing 13 carbon atoms and 8 ethoxy units.

In quantitative terms, it may be advantageous to point out that the weight proportions of the constituents of the water-repellent liquid silicone composition are such as to give, per 100 parts by weight (pw) of water:

POS (I): from 1 to 100 pw, preferably from 1 to 50 and even more preferably from 1 to 15 pw;

surfactants: from 0.01 to 10 pw, preferably from 0.1 to 10 and even more preferably from 1 to 5 pw.

The present invention is not exclusive of other liquid forms of water-repellent silicone compositions, than aqueous emulsions. Thus, said water-repellent liquid silicone composition may be a solution of the POS(s) (I) in an organic solvent.

Examples of organic solvents that may be mentioned include white spirit and heptane.

According to one advantageous mode of the invention, the porous building material [preferably a mineral or (ligno) cellulosic material] is selected from the group comprising:

$CaCO_3$-based minerals,
$SiO_2$-based minerals,
aluminosilicate-based minerals,
concretes/mortars,
terracottas, and
mixtures thereof.

The use according to the invention is also advantageous in that the active material of the water-repellent liquid silicone composition is free of functionalized or non-functionalized silane(s).

Besides the main constituents described above, the water-repellent liquid silicone composition in accordance with the use according to the invention may also comprise additives chosen from the group comprising:

silicas, preferably colloidal silicas,
Lewis acids, preferably sulfates and/or hydrogen sulfates and/or triflates and/or oxalates and/or silicates,
silicone resins bearing siloxy units M, Q and/or T,
alkylaminosilanes preferably chosen from those of general formula (II) below:

$$R^5—[Si]—[OR^6]_3 \quad (II)$$

in which:

$R^5$ is an aminoalkyl radical containing from 1 to 6 carbon atoms or a group of general formula: $H_2N—(CH_2)_xR^7—(CH_2)_z—$; with $R^7$ representing O, S, —NH— or NH—$CH_2$—$CH_2$—NH— and $x \geq 2$, $y \geq 2$; or a group of general formula: $(R^6O)_3—(CH_2)_x—NH—(CH_2)_x$, with x as defined above;

$R^6$ corresponding to $C_nH_{2n+1}$ with n=0 to 10;

aminated additives, and
mixtures thereof.

Examples of suitable Lewis acids that may be mentioned include aluminum, iron, calcium, nickel, etc. sulfates.

Examples of suitable aminoalkylsilanes that may be mentioned include hydroxylated aminosilanes such as aminopropyltrihydroxysilane.

The aminated additives may act as stabilizers for the water-repellent liquid silicone composition, before crosslinking and/or polymerization. These stabilizers bearing amine functions may be, for example, hindered amines such as the amines of HALS type. PCT patent application WO-98/07798 discloses amines that may be used as stabilizers in the water-repellent liquid silicone composition, in accordance with the use according to the invention.

The concentrations of all these additives are, for example, from about 0.1 to 10 parts by dry weight. Among these additives that may be distinguished are the additives that are combined with the aqueous phase in the case of an emulsion, i.e. silicas and salts, and additives that are compatible with the oily silicone phase (POS I), i.e. silicone resins containing MQ and/or T and optionally D units.

Moreover, conventionally, antifoam adjuvants, biocides, rheology modifiers, coalescers, dispersants, neutralizers and/or thickeners may also be used.

The concentrations of such adjuvants are known to those skilled in the art.

Preferably, the composition according to the invention is free of organic copolymer(s). In practice, and more specifically, it is the active material of the composition that does not comprise any organic copolymer(s).

According to another of its aspects, the present invention relates to a process for making a porous building material water-repellent, this process consisting in impregnating said material with a liquid composition comprising at least one polyorganosiloxane (POS), characterized in that:
a linear or cyclic POS is used, bearing units

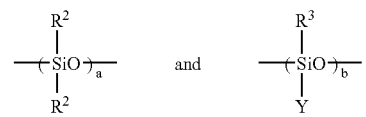

this POS preferably being linear, of formula (I):

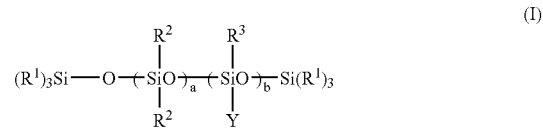

in which:
the radicals $R^1$ are identical to or different than each other and each represent an alkyl, an aryl, an arylalkyl or Y; preferably a linear or branched $C_1$–$C_{10}$ alkyl or a phenyl;
the radicals $R^2$ are identical to or different than each other and each represent an alkyl, an aryl or an arylalkyl; preferably a linear or branched $C_1$–$C_{10}$ alkyl or a phenyl;
the radical $R^3$ represents an alkyl, an aryl, an arylalkyl or Y; preferably a linear or branched $C_1$–$C_{10}$ alkyl or a phenyl;
the radical Y is a functional radical chosen from those carrying at least one epoxy unit;
a and b are chosen such that:

$$1 < a+b \leq 1\,000$$

preferably $$10 < a+b \leq 200$$

and even more preferably $$50 \leq a+b \leq 100$$

and $$1/1\,000 \leq b/(a+b) \leq 1$$

preferably $1/100 \leq b/(a+b) \leq 4/5$ and even more preferably $1/20 \leq b/(a+b) \leq 3/4$, b may be equal to 0, and in this case at least one of the radicals $R^1$ represents Y, preferably at least one of the radicals $R^1$ on each of the two terminal Si atoms of the POS of formula (I) corresponds to Y, the latter composition is applied to the porous building material, the POS (I) is left in contact with the porous building material [for example a mineral or (ligno)cellulosic material] so that said POS (I) crosslinks and/or a reaction of POS (I) with the material takes place, this reaction leading to the formation of bonds between the POS (I) and the material.

As regards the preparation of the water-repellent liquid silicone compositions, the invention also proposes the use of at least one linear or cyclic POS bearing units

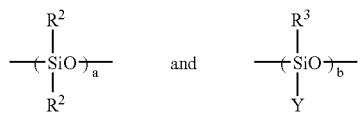

this POS preferably being linear, of formula (I):

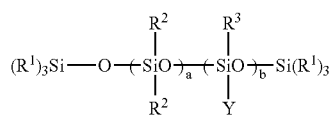

in which:
the radicals $R^1$ are identical to or different than each other and each represent an alkyl, an aryl, an arylalkyl or Y; preferably a linear or branched $C_1$–$C_{10}$ alkyl or a phenyl;
the radicals $R^2$ are identical to or different than each other and each represent an alkyl, an aryl or an arylalkyl; preferably a linear or branched $C_1$–$C_{10}$ alkyl or a phenyl;
the radical $R^3$ represents an alkyl, an aryl, an arylalkyl or Y; preferably a linear or branched $C_1$–$C_{10}$ alkyl or a phenyl;
the radical Y is a functional radical chosen from those carrying at least one epoxy unit;
a and b are chosen such that:

$1 \leq a+b \leq 1\,000$ preferably $10 \leq a+b \leq 200$ and even more preferably $50 \leq a+b \leq 100$ and $1/1\,000 \leq b/(a+b) < 1$ preferably $1/100 \leq b/(a+b) \leq 4/5$ and even more preferably $1/20 \leq b/(a+b) \leq 3/4$, b may be equal to 0, and in this case at least one of the radicals $R^1$ represents Y, preferably at least one of the radicals $R^1$ on each of the two terminal Si atoms of the POS of formula (I) corresponds to Y, for the preparation of a water-repellent liquid silicone composition for a porous mineral building material, the active material of this composition being composed of at least 50% by weight, preferably at least 80% by weight and even more preferably at least 90% by weight of the POS (I):

this POS (I) being capable by itself of crosslinking as soon as it comes into contact with the building material and/or of reacting with said material to bind thereto.

This water-repellent liquid silicone composition is advantageously an aqueous emulsion comprising at least one POS (I), at least one surfactant and water.

Finally, the invention relates to a process for preparing a water-repellent liquid silicone composition for a porous mineral building material, characterized in that it consists essentially:

in using a POS, which is preferably linear, of formula (I):

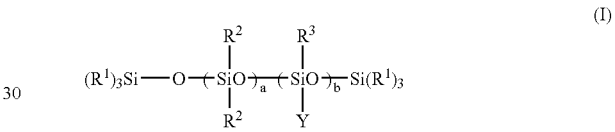

in which:
the radicals $R^1$ are identical to or different than each other and each represent an alkyl, an aryl, an arylalkyl or Y; preferably a linear or branched $C_1$–$C_{10}$ alkyl or a phenyl;
the radicals $R^2$ are identical to or different than each other and each represent an alkyl, an aryl or an arylalkyl; preferably a linear or branched $C_1$–$C_{10}$ alkyl or a phenyl;
the radical $R^3$ represents an alkyl, an aryl, an arylalkyl or Y; preferably a linear or branched $C_1$–$C_{10}$ alkyl or a phenyl;
the radical Y is a functional radical chosen from those carrying at least one epoxy unit;
a and b are chosen such that:

$1 \leq a+b \leq 1\,000$ preferably $10 \leq a+b \leq 200$ and even more preferably $50 \leq a+b \leq 100$ and $1/1\,000 \leq b/(a+b) < 1$ preferably $1/100 \leq b/(a+b) \leq 4/5$ and even more preferably $1/20 \leq b/(a+b) \leq 3/4$, b may be equal to 0, and in this case at least one of the radicals $R^1$ represents Y, preferably at least one of the radicals $R^1$ on each of the two terminal Si atoms of the POS of formula (I) corresponds to Y, and then in mixing this POS (I) with water and at least one surfactant or with an organic solvent, so as to obtain an aqueous silicone emulsion or an organic silicone solution, the emulsion being more especially preferred.

The invention will be understood more clearly with the aid of the examples that follow, which describe the preparation of water-repellent liquid silicone compositions in the form of aqueous emulsions and in the form of organic solutions, the application of said compositions to building materials consisting of stones and concrete and the evaluation of the water-repellent properties obtained by implementing the use according to the invention.

EXAMPLES

Example 1

Epoxysilicones Deposited in Solvent Phase 1.1/ The POSs Used in this Example are Epoxidized POSs of Formula (I.1):

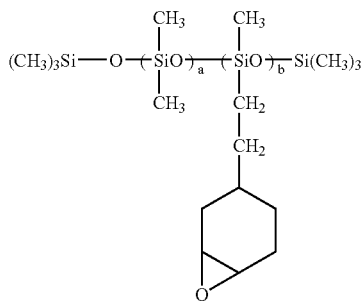

POS(I): a=4, b=8
POS(II): a=7, b=70
POS(III): a=2, b=200
POS(IV): a=100, b=0 (this is a nonfunctionalized silicone oil).

1.2/ Procedure:

The POS is dissolved in heptane to 10% by mass.

The support (in this case stone from Saint Vaast) is impregnated to a rate of 2 l/m² solution. The stones are immersed in the solution to a depth of 5 mm.

Drying is carried out for 1 day in a ventilated fume cupboard and then for 14 days in an air-conditioned room (25° C., 50% RH)

1.3/ Measurements:

The wetting angles with water are measured 1 day and 15 days after the treatment.

After drying for 15 days, the depth of the water repellency treatment is measured by breaking one of the supports and revealing the hydrophobic-treated portion by sprinkling water onto the broken faces.

After drying for 15 days, a second treated support is dipped in 2 mm of water and the water uptake of the material is monitored daily. The amounts of water taken up by the supports after immersion for 15 days and 28 days are noted. These amounts are expressed relative to the amount of water absorbed by an untreated stone. A perfect treatment thus corresponds to an uptake of 0%, and a totally ineffective treatment corresponds to an uptake of 100%.

1.4/ Results:

TABLE 1

|  | POS(I) | POS(II) | POS(III) | POS(IV) |
| --- | --- | --- | --- | --- |
| Drop angle: |  |  |  |  |
| at 1 day | 113° | 107° | 110° | 0° |
| at 15 days | 113° | 121° | 110° | 0° |
| Depth of water-repellent treatment | 14 mm | 13 mm | 10 mm | 0 mm |
| Water uptake: |  |  |  |  |
| at 15 days | <2% | <2% | <2% | 100% |
| at 28 days | <2% | <2% | <2% | 100% |

Example 2

Epoxysilicones Deposited as an Emulsion 2.1/ The POS(II) and POS(IV) are Used in this Example.

The surfactant used is an ethoxylated (8 ethoxy units) fatty alcohol (chain of 13 carbons) sold under the name ROX by the company Rhodia Chimie.

2.2/ Procedure:

The POS is emulsified in water using the above targeted surfactant by the standard emulsification processes (high-pressure homogenizer).

Emulsion A contains 10 parts of POS(II), 2 parts of surfactant and 88 parts of water.

Emulsion B contains 10 parts of POS(IV), 2 parts of surfactant and 88 parts of water.

the support (in this case stones from Saint Vaast and from Tuffeau) is impregnated to a rate of 2 l/m² with the emulsion. The stones are immersed in the solution to a depth of 5 mm.

Drying is carried out for 1 day in a ventilated fume cupboard and then for 14 days in an air-conditioned room (25° C., 50% RH).

2.3/ Measurements:

The wetting angles with water are measured 1 day and 15 days after the treatment.

After drying for 15 days, the depth of the water repellency treatment is measured by breaking one of the supports and revealing the hydrophobic-treated portion by sprinkling water onto the broken faces.

After drying for 15 days, a second treated support is dipped in 2 mm of water and the water uptake of the material is monitored daily. The amounts of water taken up by the supports after immersion for 15 days and 28 days are noted. These amounts are expressed relative to the amount of water absorbed by an untreated stone. A perfect treatment thus corresponds to an uptake of 0%, and a totally ineffective treatment corresponds to an uptake of 100%.

2.4/ Results

TABLE 3

|  | Emulsion A of POS(II) on Saint Vaast | Emulsion A of POS(II) on Tuffeau | Emulsion B of POS(IV) on Saint Vaast | Emulsion B of POS(IV) on Tuffeau |
|---|---|---|---|---|
| Drop angle: | | | | |
| at 1 day | 100° | 123° | 0° | 0° |
| at 15 days | 119° | 119° | 0° | 0° |
| Depth of water-repellent treatment | 6 mm | 1 mm | 0 mm | 0 mm |
| Water uptake: | | | | |
| at 15 days | <2% | <15% | 100% | 100% |
| at 28 days | <2% | <20% | 100% | 100% |

Example 3

Epoxysilicones Deposited as an Emulsion and Supplemented 3.1/ Emulsion E Contains:
10 parts of a mixture of POS(II) (70%) and of MQ resin (30%),
1.5 parts of surfactant, consisting of an ethoxylated (8 ethoxy units) fatty alcohol (chain of 13 carbons) sold under the name ROX by the company Rhodia Chimie,
88.5 parts of water.

Emulsion D Contains:
10 parts of POS(I),
1.5 parts of surfactant consisting of an ethoxylated (8 ethoxy units) fatty alcohol (chain of 13 carbons) sold under the name ROX by the company Rhodia Chimie,
1.5 parts of aluminum sulfate,
87 parts of water.

3.2/ Procedure:
The POS is emulsified in the water using the abovetargeted surfactant by the standard emulsification processes (high-pressure homogenizer).
The support (in this case stone from Saint Vaast) is impregnated at a rate of 2 l/m² with the emulsion. The stones are immersed in the solution to a depth of 5 mm.
Drying is carried out for 1 day in a ventilated fume cupboard and then for 14 days in an air-conditioned room (25° C., 50% RH).

3.3/ Measurements:
The wetting angles with water are measured 1 day and 15 days after the treatment.
After drying for 15 days, the depth of the water repellency treatment is measured by breaking one of the supports and revealing the hydrophobic-treated portion by sprinkling water onto the broken faces.
After drying for 15 days, a second treated support is dipped in 2 mm of water and the water uptake of the material is monitored daily. The amounts of water taken up by the supports after immersion for 15 days and 28 days are noted. These amounts are expressed relative to the amount of water absorbed by an untreated stone. A perfect treatment thus corresponds to an uptake of 0%, and a totally ineffective treatment corresponds to an uptake of 100%.

3.4/ Results:

TABLE 4

|  | Emulsion C on Saint Vaast | Emulsion D on Saint Vaast | Emulsion A on Saint Vaast |
|---|---|---|---|
| Drop angle: | | | |
| at 1 day | 130° | 118° | 100° |
| at 15 days | 128° | 122° | 119° |
| Depth of water-repellent treatment | 5 mm | 6.5 mm | 6 mm |
| Water uptake: | | | |
| at 15 days | <2% | <2% | <2% |
| at 28 days | <2% | <2% | <2% |

The invention claimed is:

1. A process for making a porous mineral building material water-repellent, this process comprising the steps of:
a) applying to said material a water-repellent liquid silicone composition comprising at least 50% by weight of a cyclic polyorganosiloxane bearing units:

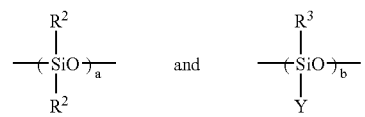

or of a linear (POS) (I) having said units, of formula (I):

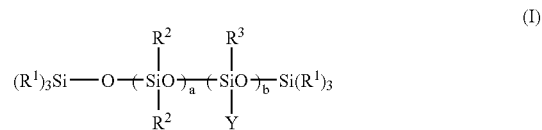

wherein:
the radicals $R^1$ are identical to or different than each other and each represent an alkyl, an aryl, an arylalkyl or Y;
the radicals $R^2$ are identical to or different than each other and each represent an alkyl, an aryl or an arylalkyl;
the radical $R^3$ represents an alkyl, an aryl, an arylalkyl or Y;
the radical Y is a functional radical carrying at least one epoxy unit;
a and b are chosen such that:

$$1 \leq a+b \leq 1\,000$$

and $$1/1\,000 \leq b/(a+b) < 1$$

if b equals to 0, at least one of the radicals $R^1$ on each of the two terminal Si atoms of the POS of formula (I) represents Y,
said cyclic or linear POS being capable by itself of crosslinking as soon as it comes into contact with the building material and or of reacting with said building material to bind thereto.
b) impregnating and penetrating said composition into said material, and c) crosslinking and/or reacting said POS with said material, leading to the formation of bonds between the POS and the material.

2. The process as claimed in claim 1, wherein the (POS) is a linear (POS) (I) having units of formula (I), wherein:

the radicals $R^1$ are a linear or branched $C_1$–$C_{10}$ alkyl or a phenyl;

the radicals $R^2$ are a linear or branched $C_1$–$C_{10}$ alkyl or a phenyl;

the radical $R^3$ represents a linear or branched $C_1$–$C_{10}$ alkyl or a phenyl;

a and b are chosen such that:

$50 \leq a+b \leq 100$ and $1/20 \leq b/(a+b) < 3/4$ and

POS (I) representing at least 90% by weight of the active material.

3. The process as claimed in claim 1, wherein b is other than 0 in formula (I).

4. The process as claimed in claim 1, wherein the POS (I) is functionalized with at least one epoxy-functional radical Y, linked to the silicon of the POS via a divalent radical containing from 2 to 20 carbon atoms which optionally contain at least one hetero atom.

5. The process as claimed in claim 4, wherein Y is one of the following radicals:

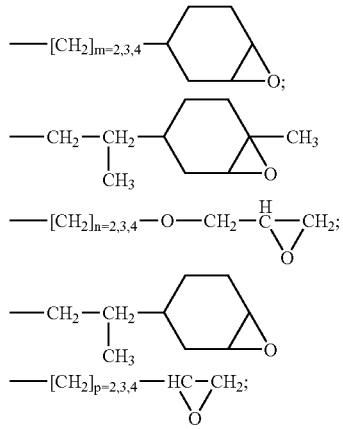
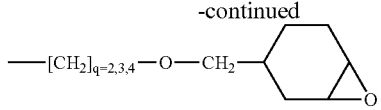

6. The process as claimed in claim 1, wherein the water-repellent liquid silicone composition is an aqueous emulsion containing:
   b) one or more POS (I),
   c) one or more surfactants, and
   d) water.

7. The process as claimed in claim 1, wherein the composition is a solution of the (POS) (I) in an organic solvent.

8. The process as claimed in claim 1, wherein the porous mineral building material is selected from the consisting of:
   $CaCO_3$-based minerals,
   $SiO_2$-based minerals,
   aluminosilicate-based minerals,
   terracottas, and
   concretes/mortars.

9. The process as claimed in claim 1, wherein the POS (I) further contains radicals Y' bearing (di)carboxy, (di)carboxylate or anhydride units and wherein the porous building material is selected from minerals comprising $CaCO_3$.

10. The process as claimed in claim 1, wherein the composition is free of functionalized or nonfunctionalized silane(s).

11. The process as claimed in claim 1, wherein the composition further comprises additives selected from the group consisting of:
   silicas,
   Lewis acids,
   silicone resins bearing siloxy units M, Q and/or T,
   alkylaminosilanes, and
   aminated additives.

12. The process as claimed in claim 11, wherein said additives are;
   colloidal silicas,
   sulfates, hydrogen sulfates, triflates, oxalates, silicates, or alkylaminosilanes of general formula (II) below:

$R^5$—[Si]—[$OR^6$]$_3$     (II)

wherein:
   $R^5$ is an aminoalkyl radical containing from 1 to 6 carbon atoms or a group of general formula: $H_2N$—$(CH_2)_x R^7$—$(CH_2)_z$—; with $R^7$ representing O, S, —NH— or NH—$CH_2$—$CH_2$—NH— and $x \leq 2$, $y \leq 2$; or a group of general formula: $(R^6O)_3$—$(CH_2)_x$—NH—$(CH_2)_x$, with x as defined above; and
   $R^6$ corresponding to $C_nH_{2n+1}$ with n is up to 10.

* * * * *